(12) United States Patent
Mead et al.

(10) Patent No.: US 11,848,940 B2
(45) Date of Patent: Dec. 19, 2023

(54) CUMULATIVE TRAJECTORY OF CYBER RECONNAISSANCE INDICATORS

(71) Applicant: The Boeing Company, Chicago, IL (US)

(72) Inventors: Jadranka Mead, Renton, WA (US); James E. Vasatka, Monroe, WA (US)

(73) Assignee: THE BOEING COMPANY, Arlington, VA (US)

( * ) Notice: Subject to any disclaimer, the term of this patent is extended or adjusted under 35 U.S.C. 154(b) by 298 days.

(21) Appl. No.: 14/839,327

(22) Filed: Aug. 28, 2015

(65) Prior Publication Data
US 2017/0201530 A1 Jul. 13, 2017

(51) Int. Cl.
*H04L 9/00* (2022.01)
*H04L 9/40* (2022.01)

(52) U.S. Cl.
CPC ........ *H04L 63/1416* (2013.01); *H04L 63/145* (2013.01); *H04L 63/1483* (2013.01)

(58) Field of Classification Search
CPC ......... H04L 63/1416; H04L 63/145; H04L 63/1483
USPC ......................................................... 726/23
See application file for complete search history.

(56) References Cited

U.S. PATENT DOCUMENTS

| | | | | |
|---|---|---|---|---|
| 8,910,188 B1 * | 12/2014 | Wang | ...................... | G06F 9/542 719/318 |
| 9,686,173 B1 * | 6/2017 | Giordano | ................. | H04L 67/01 |
| 2006/0265158 A1 * | 11/2006 | Bandholz | .............. | G06F 11/008 702/65 |
| 2006/0265748 A1 * | 11/2006 | Potok | .................... | G06F 21/552 726/23 |
| 2009/0216393 A1 * | 8/2009 | Schimert | ............ | G05B 23/0254 701/14 |
| 2011/0264608 A1 * | 10/2011 | Gonsalves | ............... | G06N 7/01 706/10 |
| 2013/0061324 A1 * | 3/2013 | Law | .................... | H04L 63/0263 726/23 |

(Continued)

OTHER PUBLICATIONS

H. P. Sanghvi et al., "Cyber Reconnaissance: An Alarm before Cyber Attack", International Journal of Computer Applications (0975-8887), vol. 63—No. 6, Feb. 2013, pp. 36-38.

*Primary Examiner* — Daniel B Potratz
*Assistant Examiner* — Syed M Ahsan
(74) *Attorney, Agent, or Firm* — MH2 Technology Law Group LLP (57) ABSTRACT

This disclosure is directed to detecting cybersecurity attacks in data processing systems. Methods, systems, and computer program products perform operations including determining baseline event clusters using baseline event data obtained from deterministic target systems. The operations also include determining a baseline cumulative trajectory of an event over time based on the baseline event clusters. The operations further include determining operational event clusters using operational event data from the deterministic target systems. Additionally, the operations include determining an operational cumulative trajectory of the event over time based on the operational event clusters. Further, the operations include detecting a cyber-attack by comparing the baseline cumulative trajectory of the event with the operational cumulative trajectory of the event.

20 Claims, 5 Drawing Sheets

(56) References Cited

U.S. PATENT DOCUMENTS

| | | | |
|---|---|---|---|
| 2013/0305357 A1* | 11/2013 | Ayyagari | H04B 7/18593 |
| | | | 726/22 |
| 2014/0283026 A1* | 9/2014 | Striem Amit | H04L 63/1416 |
| | | | 726/22 |
| 2015/0106933 A1* | 4/2015 | Lee | H04L 63/1416 |
| | | | 726/23 |
| 2017/0187730 A1* | 6/2017 | Singla | H04L 63/1416 |

* cited by examiner

CUMULATIVE TRAJECTORY OF CYBER RECONNAISSANCE INDICATORS

FIELD

The present disclosure relates generally to information security and, in particular, to detecting cybersecurity attacks in data processing systems.

BACKGROUND

Cyberspace security refers to processes and systems used to deter, detect, counter, and mitigate cyber-attacks on computers and networks. A cyber-attack may be any type of action having the purpose of disrupting, damaging, tampering, or obtaining unauthorized access to a network data processing system. Cyber-attacks may include, for example, viruses, worms, Trojans, malware, spyware, bots, spoofing, pharming, ping sweeps, email spamming, page hijacking, pop-ups, or any of numerous other unauthorized activities associated with a computer or network. Advanced persistent threats ("APT") are stealthy and continuous cyber-attacks. Such attacks use sophisticated techniques to identify vulnerabilities in systems by monitoring and extracting data from specific targets over long periods of time.

Cyber-attacks by APTs are difficult to detect because, prior to exploitation of a target, their activities are intentionally performed at low levels that do not exceed detection thresholds in existing intrusion detection system. It would be advantageous to detect the low-level activities to identify APT-cyber attacks before target systems are exploited.

SUMMARY

The present disclosure provides a method for detecting cyber-attacks. The method includes determining baseline event clusters using baseline event data obtained from deterministic target systems. The method also includes determining a baseline cumulative trajectory of an event over time based on the baseline event clusters. The method further includes determining operational event clusters using operational event data from the deterministic target systems. Additionally, the method includes determining an operational cumulative trajectory of the event over time based on the operational event clusters. Further, the method includes detecting a cyber-attack by comparing the baseline cumulative trajectory of the event with the operational cumulative trajectory of the event.

Further, the present disclosure provides a system for detecting cyber-attacks. The system includes a processor, a computer-readable hardware storage device, and program instructions stored on the computer-readable hardware storage device. When executed by the processor, the program control the system to perform operations including determining baseline event clusters using baseline event data obtained from deterministic target systems. The operations also include determining a baseline cumulative trajectory of an event over time based on the baseline event clusters. The operations further include determining operational event clusters using operational event data from the deterministic target systems. Additionally, the operations include determining an operational cumulative trajectory of the event over time based on the operational event clusters. Further, the operations include detecting a cyber-attack by comparing the baseline cumulative trajectory of the event with the operational cumulative trajectory of the event.

Still further, the present disclosure provides a computer-program product comprising computer-readable program instructions stored on a computer-readable data storage device that, when executed by a computer processor, controls a computing device to perform operations including determining baseline event clusters using baseline event data obtained from deterministic target systems. The operations also include determining a baseline cumulative trajectory of an event over time based on the baseline event clusters. The operations further include determining operational event clusters using operational event data from the deterministic target systems. Additionally, the operations include determining an operational cumulative trajectory of the event over time based on the operational event clusters. Further, the operations include detecting a cyber-attack by comparing the baseline cumulative trajectory of the event with the operational cumulative trajectory of the event.

BRIEF DESCRIPTION OF THE DRAWINGS

The accompanying drawings, which are incorporated in and constitute a part of this specification, illustrate the present teachings and together with the description, serve to explain the principles of the disclosure.

It should be noted that some details of the figures have been simplified and are drawn to facilitate understanding of the present teachings, rather than to maintain strict structural accuracy, detail, and scale.

DETAILED DESCRIPTION

The present disclosure relates to detecting APT cyber-attacks. As noted above, APTs are sophisticated attackers that operate in a stealthy manner over long periods of time. Such cyber-attacks can be categorized into three phases: an infiltration phase, a reconnaissance phase, and an exploitation phase (a.k.a., a conclusion phase). After infiltration, a cyber-attacker (e.g., a malefactor and/or malware) may perform reconnaissance activities, which attempt to identify capabilities vulnerabilities in a target system or systems without being detected. Accordingly, the reconnaissance phase may characterized by low-frequency and/or low-activity probing. The probing can include using software that actively and/or passively interrogates or monitors system activities of data processing systems to determine network information (e.g., IP addresses, subnet masks, network topology, and domain names), host information (e.g., user names group names, architecture type, operating system family, and TCP and UDP services), human information (e.g., user's telephone addresses, telephone numbers, habits, personal information), and security policies (e.g., password requirements, account retention policies, firewalls, and intrusion detection systems). Additionally, to increase the scope and/or effectiveness of an attack, cyber-attackers may contemporaneously infiltrate and reconnoiter numerous similar systems (e.g., systems have the same or similar the type of architecture type, operating system, networks, ports used, etc.), which can uncover shared vulnerabilities to allow parallel exploitation of the similar systems.

Cyber-attacks by APTs are difficult to detect in the reconnaissance phase because, by design, the activities involved are intentionally performed at levels that do not exceed thresholds which would cause an alert by intrusion detection systems running on individual systems. Advantageously, embodiments disclosed herein do not detect reconnaissance activities based on such individual thresholds. Rather, embodiments in accordance with aspects of the disclosure detect APT cyber-attacks occurring substantially contemporaneously in a number of deterministic data processing systems, such as data processing devices used in industrial control systems and aircraft avionics systems.

Embodiments in accordance with aspects of the present disclosure identify similar systems among groups of one or more types of systems (e.g., per type of on board network systems, on-board avionics being monitored, and routes flown), place the systems in different clusters based on their similarities, and extrapolate profiles of events as they accumulate over two dimensions (e.g., time and fleet). In this manner, long term, stealthy activities characteristic of APT cyber-attacks occurring across different, but similar systems (e.g., a fleet of airplanes having similar profiles) are detected via cumulative information.

Some embodiments discussed herein are exemplified in terms of airplane and/or airline operations including, by not limited to aircraft on-board systems (such as avionics), wherein reconnaissance activities are detected across fleets of similarly configured aircraft. However, implementations of the present disclosure are not limited to such embodiments. Many other systems (and systems of systems) used in the aviation industry are deterministic. Additionally, systems and methods consistent with the present disclosure can be applied to deterministic systems used in industrial, manufacturing, finance and other such industries.

Figure 1:
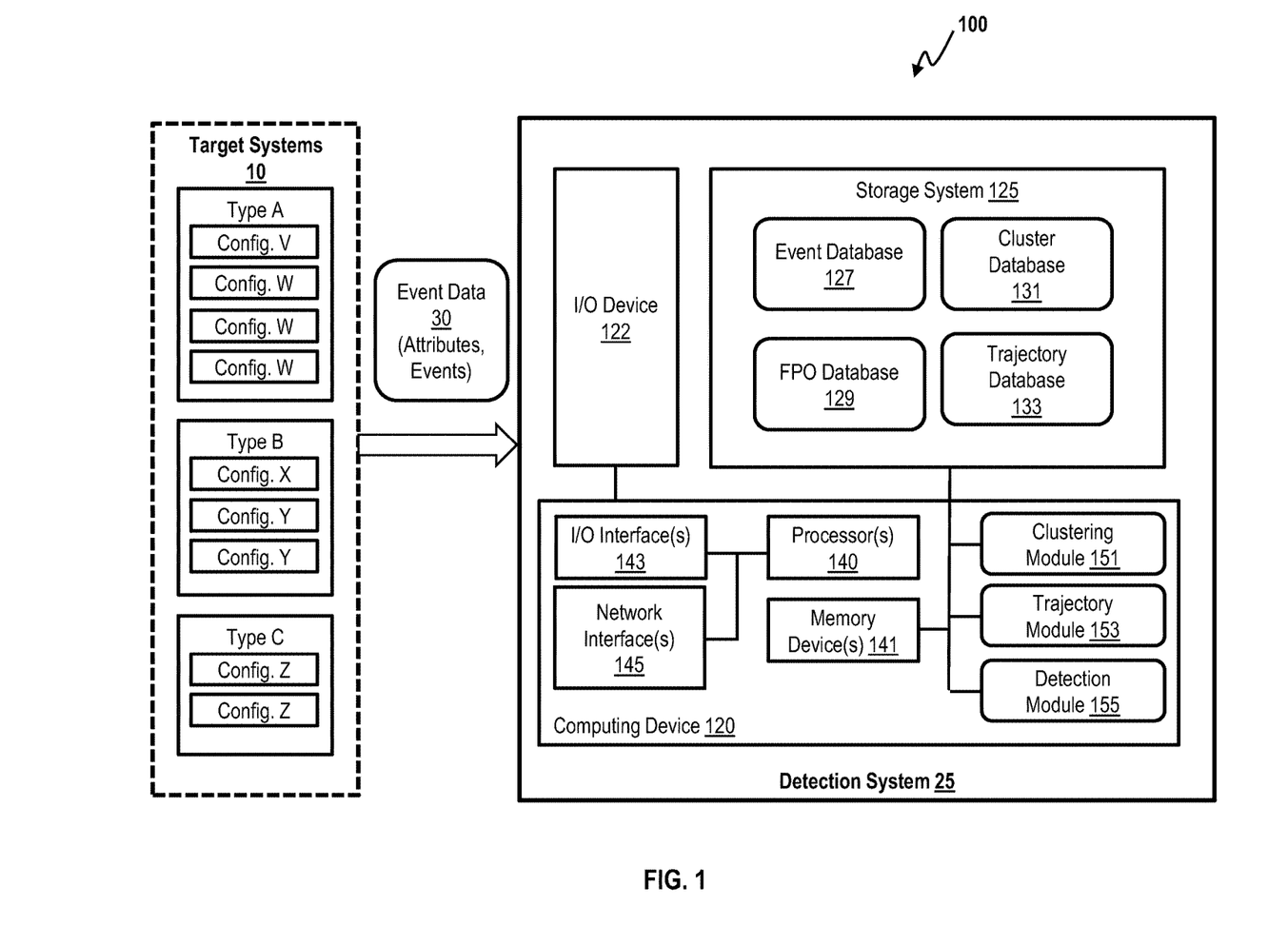
FIG. 1 illustrates a block diagram of an exemplary environment for implementing systems and processes in accordance with aspects of the disclosure.

FIG. 1 is an exemplary environment 100 for implementing methods and systems in accordance with aspects of the disclosure. The environment 100 includes target systems 10 and a detection system 25, which receives event data 30 from the target systems 10. The target systems 10 can be any type of deterministic system (i.e., entirely deterministic, partially deterministic, and nearly deterministic). Entirely deterministic systems are systems in which no randomness is involved in the development of future states of the system. Put another way, deterministic systems are finite state machines that always produce the same output from a given starting condition or initial state. Partially deterministic systems and nearly deterministic systems are systems that include some non-deterministic functions, but whose functionality incorporates one or more deterministic components. For example, a system including non-deterministic command and control logic may selectively employ one of a number of finite state machines based on a given condition or state of the system (e.g., an autonomous walking robot having a deterministic system that controls limb motion).

The target systems 10 can include different types (A, B, C), each of which is a deterministic system. Further, each type (A, B, C) of system can include one or more different configurations (e.g., V, W, X, Y, Z). For example, the different types of systems can be different fleets of aircraft (e.g., shot-haul aircraft, medium-haul aircraft, and long-haul aircraft), and the different types of configurations can be various architectures and/or avionics packages fielded on the aircraft, wherein each fleet of aircraft can include one or more configurations. While only a few types and configurations are illustrated in FIG. 1 for the sake of example, it is understood that systems and methods in accordance with embodiments of the present disclosure can include a greater number of types and/or configurations.

In accordance with aspects of the present disclosure, the detection system 25 includes hardware and software that perform the processes and functions described herein. In particular, the detection system 25 includes a computing device 120, an input/output (I/O) device 122, and a storage system 125. The I/O device 122 can include any device that enables an individual to interact with the computing device 120 (e.g., a user interface) and/or any device that enables the computing device 120 to communicate with one or more other computing devices using any type of communications link. The I/O device 122 can be for example, a handheld device, PDA, touchscreen display, handset, keyboard, etc.

The storage system 125 can comprise a computer-readable, non-volatile hardware storage device that stores information and program instructions. For example, the storage system 25 can be one or more flash drives and/or hard disk drives. In accordance with aspects of the present disclosure, the information stored by the storage system 125 can include an event database 127, a feature pair observation (FPO) database 129, a cluster database 131, and a trajectory database 133, which are described in greater detail below.

In embodiments, the computing device 120 includes one or more processors 140, one or more memory devices 141 (e.g., RAM and ROM), one or more I/O interfaces 143, and one or more network interfaces 144. The memory device 141 can include a local memory (e.g., a random access memory and a cache memory) employed during execution of program instructions. Additionally, the computing device 130 includes at least one communication channel 146 (e.g., a data bus) by which it communicates with the I/O device 122, the storage system 125.

The processor 140 executes computer program instructions (e.g., an operating system), which can be stored in the memory device 141 and/or storage system 125. Moreover, in accordance with aspects of the present disclosure, the processor 140 can execute computer program instructions of a clustering module, 151, a trajectory module 153, and a detection module 155 to perform one or more of the processes described herein. The clustering module 151, the trajectory module 153, and the detection module 155 can be implemented as one or more sets of program instructions in the memory device 141 and/or the storage system 125 as separate or combined modules. Additionally, the clustering module 151, the trajectory module 153, and the detection module 155 can be implemented as separate dedicated processors or a single or several processors to provide the function of these modules.

In accordance with embodiments of the disclosure, the clustering module 151 is computer program instructions stored in, for example, the memory device 141 and/or the storage system 125 that, when executed by the processor 140, causes the computing device 120 to determine clusters of events based on event data 30 obtained from the target systems 10. The event data 30 includes attributes describing the target system 10 and/or event data 30. In embodiments, the attributes are metadata of a respective target system 10 and/or the event data 30 generated by the target system 10. Additionally event data 30 includes records logged by deterministic data processing systems operated by the target systems 10 during operations. For example, where the target systems 10 are aircraft, the attributes can include aircraft operator, aircraft model, flight numbers, flight routes, flight duration, flight distance, and flight time. And, the event data 30 can be information logged by avionics systems (e.g., a FCC, a FMC, an EIU, an EMU, an IRU, a GPWS, etc.) during one or more flights. Each record of the event data 30 can associate particular events indicative of activities performed in a cyber-attack (e.g., port scanning, vulnerability probing), with a target system type (A, B, C), a target system configuration (U, V, W, X, Y, Z), and a timestamp. The clusters module 10 classifies the event data 30 received from the different target systems 10 into similar groupings such that variability in subsequent analysis is minimized, which increases the speed and accuracy of the detection system 25.

In accordance with embodiments of the disclosure, the trajectory module 153 is computer program instructions stored in, for example, the memory device 141 and/or the storage system 120 that, when executed by the processor 140, causes the computing device 120 to partition the above clusters, and for each cluster, compute the trajectories of cumulative events through the multi-dimensional (e.g., two-dimensional or three-dimensional) spaces of observations that correspond to a rolling wave over a time period (e.g., 3-month intervals) of the event data 30. Thus, the trajectory module 153 can capture events resulting from low-frequency and/or low-activity of the target systems by an APT cyber-attack in deterministic systems as such events accumulate over time.

In accordance with embodiments of the disclosure, the detection module 155 is computer program instructions stored in, for example, the memory device 141 and/or the storage system 120 that, when executed by the processor 140, causes the computing device 120 to detect an APT attack based on comparisons of cumulative trajectories determined from event data 30 of baseline target systems 10 (e.g., clean systems prior to any cyber-attack) to cumulative trajectories determined from event data 30 of operational target systems 10 (e.g., fielded systems that may have been infiltrated by a cyber-attack).

It is noted that the computing device 120 can comprise any general-purpose computing article of manufacture capable of executing computer program instructions installed thereon (e.g., a personal computer, server, etc.). However, the computing device 120 is only representative of various possible equivalent-computing devices that can perform the processes described herein. To this extent, in embodiments, the functionality provided by the computing device 120 can be any combination of general and/or specific purpose hardware and/or computer program instructions. In each embodiment, the program instructions and hardware can be created using standard programming and engineering techniques, respectively.

Figure 2:
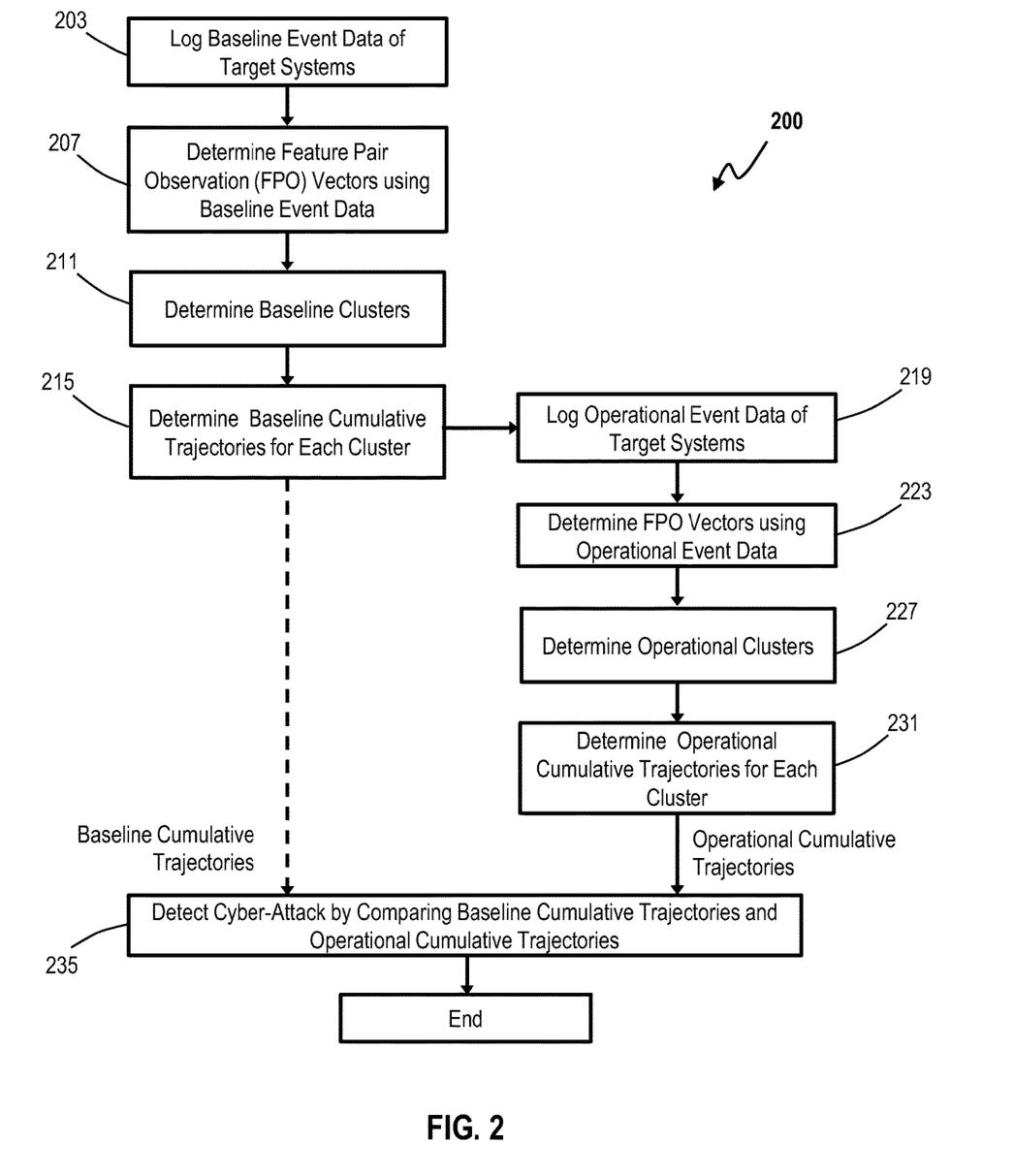
FIG. 2 illustrates a flow diagram of an exemplary process for detecting APT cyber-attacks in accordance with aspects of the present disclosure.

FIG. 2 illustrates a flow diagram of an exemplary process 200 for detecting APT cyber-attacks on deterministic systems (e.g., target systems 10) in accordance with aspects of the present disclosure. At 203, a clustering module (e.g., clustering module 151) logs baseline event data (e.g., event data 30) obtained from target systems (e.g., target systems 10). The baseline event data can be received from the target systems (e.g., target systems 10) continuously or periodically (e.g., every minute, hour, or day) and stored in a database (e.g., event database 127) for further analysis by the detection system. For example, where the target systems are a fleet of aircraft, the cluster module can receive daily event data logs accumulated during flights made by each of the aircraft in the fleet.

The baseline event data is obtained from deterministic data processing systems operating in the target systems prior to any cyber-attack. For example, the baseline event data can be obtained from the target systems directly after they initially fielded or directly after being upgraded such that no APT has had an opportunity to infiltrate the target systems. In embodiments, the baseline event data is time-stamped information of predefined types of data processing events that are indicative of APT cyber-attacks (i.e., expected sensitive reconnaissance indicators). For example, the baseline event data can include synchronize ("SYN") events, acknowledge ("ACK") events, and login events in data processing systems of the target systems.

At 207, the clustering module determines feature pair observation (FPO) vectors using the baseline event data logged at 203. The FPO vectors are pairs of complementary events in the event data that are related to activities performed during APT cyber-attacks, and which support each other in order to elicit a response from the data processors of the target systems. For example, complementary features include port scanning and TCP/IP stack fingerprinting, port scanning and login attempts, and TCP/IP stack fingerprinting and file access. The complementary features can be stored in a database (e.g., in FPO database 129), which can be indexed based on the type and configuration of the target systems. For example, in an fleet of aircraft, complementary features can be indexed by type and configuration, and takes the following form:

$$FPO_{type,config}=<\text{observed-feature1},\text{observed-feature2}>$$

In the example above, the complementary features "observed-feature1" and "observed-feature2" are each observations (e.g., a count) corresponding to potential APT cyber-attack activities. As a more specific example, a FPO vectors for port scanning activities of a cyber-attack could be represented as a vector, wherein observed-feature1 is <number-of-ACKs, number-of-SYNs> (e.g. <20,75>), and an observed-feature2 might be a number of login attempts (e.g., 150). One FPO vector would then, for this algorithm, take the form:

$$PortScan_{type,config}=<<20,75>,150>>$$

Figure 3:
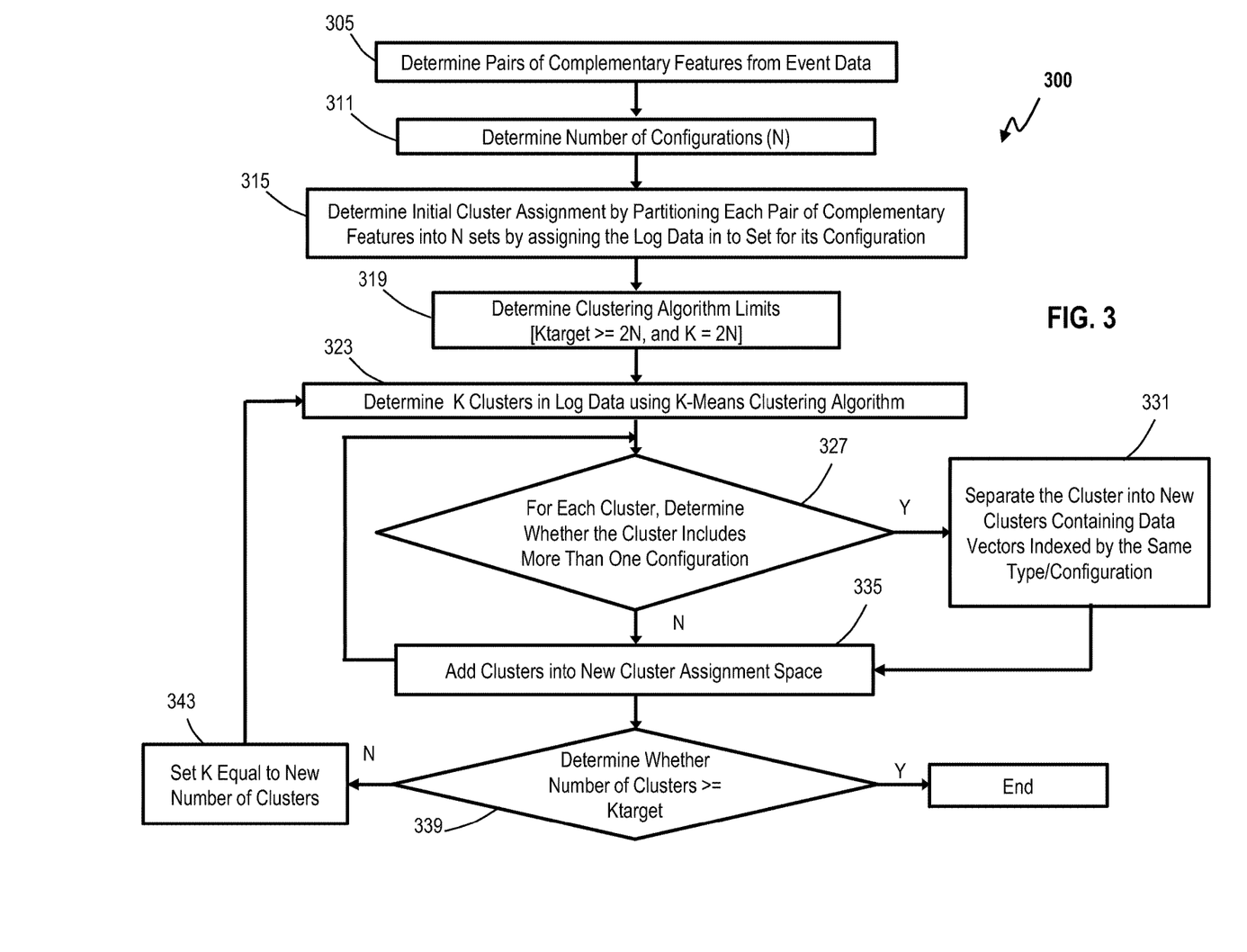
FIG. 3 illustrates a flow diagram of an exemplary process for determining clusters in accordance with aspects of the present disclosure.

At 211, the clustering module determines baseline clusters by separating the FPO vectors (event observations) into separate clusters using the types and configurations of the target systems in the event data logged at 203 and using clustering process (e.g., a modified K-means clustering algorithm such as shown in FIG. 3). In accordance with aspects of the present disclosure, the clustering module gathers similar attributes (e.g., flight route, distance, etc.) of the events associated with FPO vectors within the same type and configuration of event data (e.g., aircraft type and configuration). As a result, all events of the FPO vectors are partitioned into clusters (e.g., subset) containing corresponding attributes (e.g., a certain set of routes, airlines, distances or other attributes that give them similarity of behavior). At the same time, each baseline cluster includes event data corresponding to respective types and configurations of the target systems. Another baseline cluster may contain attributes (e.g., routes, distances, etc.) for that same airline and the same airplane type/configuration, and so on for a different airplane type and configuration. In other words, the baseline clusters are indexed by the attributes by which they were separated. In some embodiments in which the target systems are aircraft, the attributes will consist of, at a minimum, an aircraft type and configuration, and may contain other attributes as well, such as routes, flights, distances, geographical areas, seasons, airlines, and so on.

At 215, a trajectory module (e.g., trajectory module 153) determines baseline cumulative trajectories for each cluster determined at 211. That is, the trajectory module partitions each cluster into discrete time intervals (X, e.g., a week) within a time period that is longer than the expected length of an APT reconnaissance phase (e.g., longer than three months). For each time interval, the trajectory module determines a centroid of the respective partition. Based on the centroid of the respective partition, a cumulative rolling wave is determined. For the first time interval, a first cumulative rolling wave is the centroid of the first partition (as there are no prior partitions). For the second time interval, the second cumulative rolling wave is the sum of the centroids for the first time interval and the second time interval. For the third time interval, the third cumulative rolling wave is the sum of the centroids for the first time interval, the second time interval, and the third time interval. For an Xth time interval, the Xth cumulative rolling wave is the sum of the centroids for the 1 . . . Xth time interval. The centroid values determined by the trajectory module are stored in a database (e.g., trajectory database 133) for future use. It is understood that the determination of the cumulative rolling wave is not limited to the above method and can be performed using different time frames and different combinations of the centroids. For example, in some embodiments, the trajectory module can determine the cumulative rolling wave by summing the centroids of first time interval and the second time interval (e.g., week 1 plus week 2), then summing the centroids of the second time interval and the third time interval (e.g., week 2 plus week 3), summing the centroids of the third time interval and the fourth time interval (e.g., week 3 plus week 4), an so on.

After the detection system determines the baseline cumulative trajectories at 215, the baseline cumulative trajectories can be used as reference information that is compared with cumulative trajectories determined based on operational event data obtained from operational target systems (which can be the same as the baseline target systems after being fielded). Because the target systems are fielded and operational, the target systems may have been exposed to potential APT cyber-attacks, which can be detected by the detection system by comparison with the baseline cumulative trajectories.

At 219, the clustering module logs operational event data (e.g., event data 30) obtained from target systems (e.g., target systems 10) in a same or similar matter to that described at 203. At 223, the clustering module determines feature pair observation vectors using the operational event data logged at 203 in a same or similar manner to that described at 207. At 227, the clustering module determines clusters by separating the FPO vectors determined at 223 using the same attributes as used in 211. For example, the operational FPO vectors will be gathered into clusters belonging to the same routes, airlines, and types and configurations, as identified in 211 for the baseline clusters. At 231, the trajectory module determines operational cumulative trajectories for each cluster determined at 227 in a same or similar manner to that described at 215.

At 235, a detection module (e.g., detection module 155) detects whether an APT cyber-attack has occurred by comparing the baseline cumulative trajectories determined at 215, and the operational cumulative trajectories determined at 231. In embodiments, the detection module detects the APT cyber-attack by comparing plots of successive values of the cumulative rolling wave centroids. As the target systems are deterministic, the baseline cumulative trajectories and the operational cumulative trajectories are expected to be substantially the same under normal operations (i.e., outside a cyber-attack). Thus, if the baseline cumulative trajectories and the operational cumulative trajectories diverge by more than a predetermined distance, the detection module can issue an indication (e.g., an alarm) of an APT cyber-attack (e.g., via I/O interface 143).

FIG. 3 illustrates a flow diagram of an exemplary process 300 for determining clusters in accordance with aspects of the present disclosure. The process 300 can be used to determine clusters based on baseline event data (e.g., in FIG. 2, at 211) and to determine clusters based on operational event data (e.g., in FIG. 2, at 227). At 305, a clustering module (e.g., clustering module 151) determines (e.g. extracts) pairs of complementary events from event data (e.g., event data 30) stored in an event log (e.g., event database 127). The event data can include a set of predefined events (1, . . . , P) from a number of different systems (e.g., types A, B, C), having a number of different configurations (e.g., configurations V, W, X, Y, Z). For example, the events can include, but are not limited to, SYNs, ACKs, and Login attempts. The event data in the event log can store the pairs of complementary events as feature pair observation (FPO) vectors in a database (e.g., FPO database 129) for further analysis, wherein the FPO vector records in the database index the pairs of complementary with the type and configuration of the target system that was the source of the event data. For example, the event data can be indexed by aircraft fleet and aircraft configuration of each aircraft for which the event data was obtained (e.g., vectorY<#SYNs, #Login Attempts> Fleet A, Config X).

At 311, the clustering module determines a number of configurations (N) in the events logged at 303. In an example, for each distinct configuration, a unique number N from <1, . . . , 5> can be respectively assigned to each configuration. At 315, for each pair of complementary features determined at 305, the clustering module determines an initial cluster assignment by assigning the pair of complementary feature to an initial set N from <1, . . . , N> determined at 311.

At 319, the clustering module determines a clustering algorithm limits based on the number of clusters, as follows:

$$K_{target} > 2N; \text{ and}$$

$$K = 2N.$$

At 323, for Ktarget>K, the clustering module determines clusters perform K-means clustering using Euclidian distance and K=2N, with the initial cluster assignment inherited from 315 until a local optimum is reached. At 327, the clustering module determines whether the each new cluster includes more than one configuration. If the determination at 327 is "yes," then at 332 the clustering module separates the cluster into new clusters containing complementary features indexed by the same type and configuration, and the new clusters are added to the new cluster assignment space. If the determination at 327 is "no," then at 335 the cluster module keeps the cluster unmodified and adds the new cluster determined at 323 to the new cluster assignment space. At 339, the clustering module determines whether the number of clusters exceeds the cluster limit (Ktarget). If the determination at 339 is "yes," then the process 300 ends. If the determination at 339 is "no," then at 343 the number of clusters (K) is set to the new number of clusters based after the addition at 335, and the process iteratively returns to 323.

Figure 4:
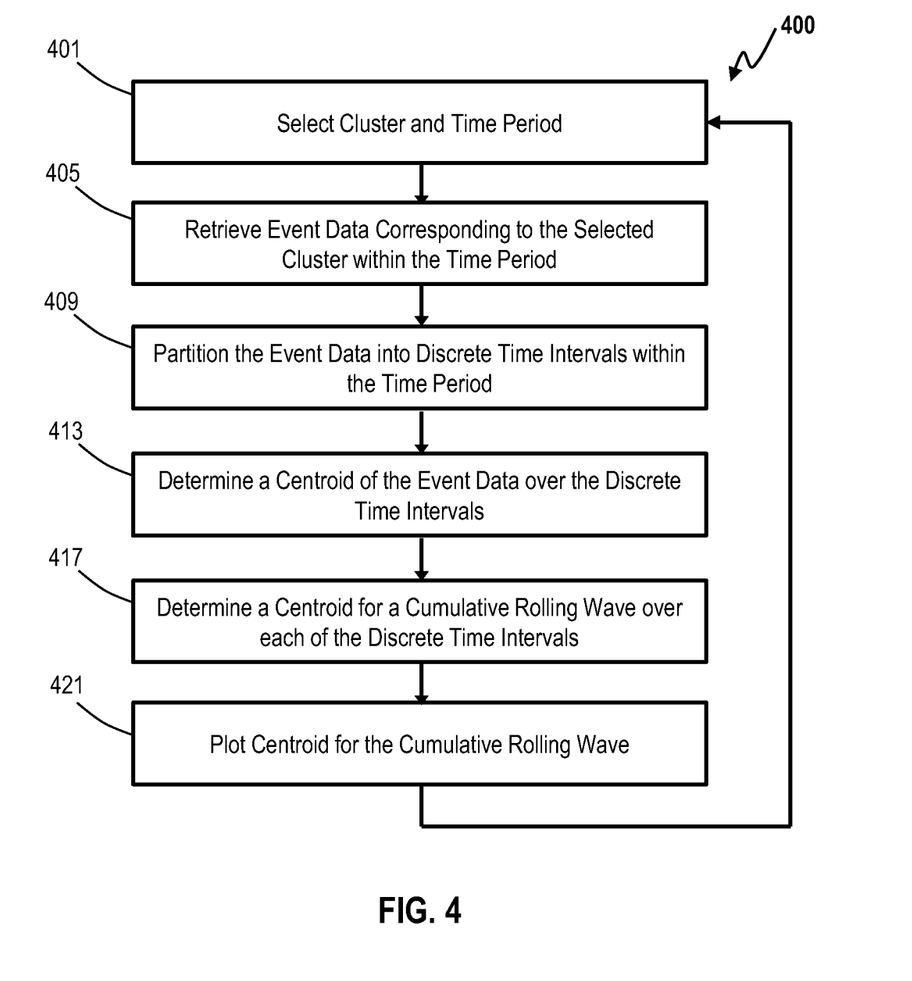
FIG. 4 illustrates a flow diagram of an exemplary process for determining cumulative trajectories in accordance with aspects of the present disclosure.

FIG. 4 illustrates a flow diagram of an exemplary process 400 for computing cumulative trajectories in accordance with aspects of the present disclosure. The process 400 can be used to iteratively determine cumulative trajectories based on baseline event data and to determine cumulative trajectories based on operational event data. At 401, a trajectory module (e.g., trajectory module 103) selects a cluster (K) from a set of stored clusters (e.g., cluster database 131) and a time period for analysis. The time period can be selected to be a span of time greater than a reconnaissance phase of an APT attack (e.g., three months) such that the event data encompasses the period of interest. At 405, the trajectory module retrieves stored event data (e.g., from event database 127) corresponding to the selected cluster that is within the selected time period. At 409, the trajectory module partitions the event data retrieved at 405 into discrete time intervals within the time period selected at 405. In embodiments, the trajectory module separates the time series corresponding to a number of discrete time intervals (t1, ..., tn), where each discrete time interval is less than total duration of the reconnaissance phase.

At 413, the trajectory module determines centroids at each of the discrete time-intervals partitioned at 409. The centroids are points that minimize the sum of squared Euclidian distances between itself and each point in the set.

At 417, the trajectory module determines a centroid of a rolling wave for the desired range of the discrete time intervals. For example, for the rolling wave of intervals <ts, ..., tk>, the trajectory module computes the cumulative centroid of the rolling wave as a (vector) sum of centroids previously computed for the discrete time intervals ts, ..., tk At 421, the trajectory module plots the centroid for the cumulative rolling wave. For example, the trajectory module determines a cumulative reconnaissance indicator trajectory spanning the centroid points C1, ..., CM. The process 400 can then iteratively return to step 401, in which a next cluster is selected for analysis.

As described above, the process 400 uses reduced equation notations for centroid computation to represent one-dimensional vectors (scalars). However, it is understood, The formulas can be used for multi-dimensional vectors by substituting vector notation into scalar notations.

Figure 5:
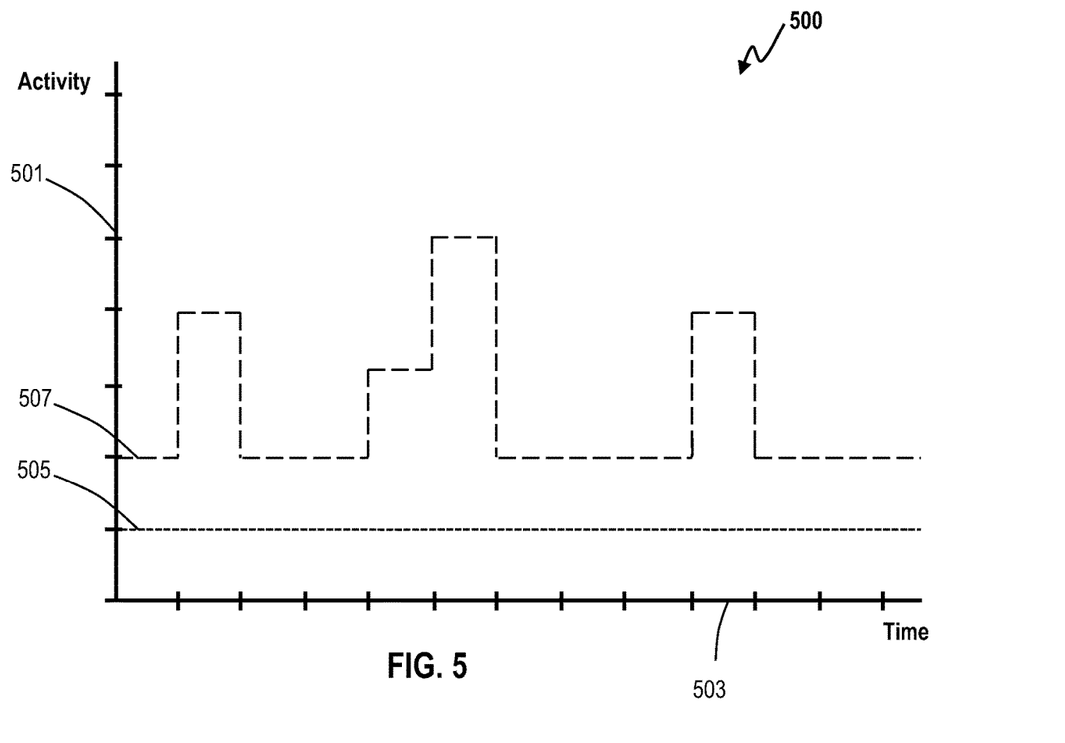
FIG. 5 is a graph illustrating example plots of cumulative rolling waves of centroids in accordance with aspects of the present disclosure.

FIG. 5 is a graph 500 illustrating example plots of cumulative rolling waves of centroids in accordance with aspects of the present disclosure. The vertical axis 501 of the graph represents a count of an activity indicative a cyber attack (e.g., failed logins). The horizontal axis 503 illustrates discrete time intervals over a selected time period. Plot 505 illustrates a cumulative rolling wave for the activity determined based on baseline event data. Plot 507 illustrates a cumulative rolling wave for the activity determined based on operational event data, wherein a system is subject to an APT cyber attack. Because target systems (e.g., target systems 10) in accordance with aspects of the present disclosure, the plot 505 corresponding to the baseline event data is predictable and consistent. In comparison, a detection module (e.g., detection module 155) identified small divergences of plot 507 from plot 505 as indicative of cyber-attack activities. Thus, an individual or an automated system can efficiently detect an APT attack based on the distance between plot 505 and plot 507.

As detailed above, implementations of detection systems and processes disclosed herein, the process enables detection of cyber-attacks before the exploitation phase. Moreover, the disclosed systems and processes enable the detection to more accurately and more efficiently detect APT cyber-attacks than existing intrusion detection systems, which are cannot effectively detect activities in the reconnaissance phase of an APT cyber-attack. Thus, unlike the existing technology, implementations of a detection systems and processes disclosed herein give time to analysts to investigate the APT cyber-attacks before they progress to the exploitation phase. Additionally, implementations of a detection systems and processes disclosed herein transform event data into information that characterize the APT cyber-attaches, which can be fed into a knowledge database for training machine learning algorithms.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
   receiving, by a processor, baseline event data during operation of a plurality of target systems directly after being initially fielded or directly after being upgraded, the baseline event data including records logged by deterministic data processing systems operated by the plurality of target systems, the baseline event data being time-stamped information of predefined types of data processing events that are indicative of advanced persistent threat cyber-attacks;
   determining, by the processor, a plurality of baseline event clusters using the baseline event data by determining one or more pairs of complementary baseline events recorded in the baseline event data that are related to activities performed during an advanced persistent threat cyber-attack to elicit a response from the plurality of target systems;
   determining, by the processor, a baseline cumulative trajectory of each of the plurality of baseline event clusters by partitioning the each of the plurality of baseline event clusters into a plurality of first discrete time intervals within a first time period that is longer than an expected length of a reconnaissance phase of the advanced persistent threat cyber-attack, the determining the baseline cumulative trajectory of the each of the plurality of baseline event clusters further comprising:
      determining a first centroid of a respective baseline event cluster at the each of the plurality of first discrete time intervals to which the respective baseline event cluster is partitioned, and
      determining a centroid for a baseline cumulative rolling wave corresponding to the respective baseline event cluster at the each of the plurality of first discrete time intervals to which the respective baseline event cluster is partitioned using a sum of the first centroid of the each of the plurality of first discrete time intervals to which the respective baseline event cluster is partitioned and the first centroids of all previous first discrete time intervals of the each of the plurality of first discrete time intervals to which the respective baseline event cluster is partitioned, the baseline cumulative rolling wave for a first one of the plurality of first discrete time intervals to which the respective baseline event cluster is partitioned is the first centroid of the first one of the plurality of first discrete time intervals;
   receiving, by the processor and from the plurality of the target systems, operational event data including records logged by the deterministic data processing systems, the operational event data being time-stamped information of predefined types of data processing events that are indicative of advanced persistent threat cyber-attacks;
   determining, by the processor, a plurality of operational event clusters using the operational event data by determining one or more pairs of complementary operational events recorded in the operational event data that are related to the activities performed during the advanced persistent threat cyber-attack;
   determining, by the processor, an operational cumulative trajectory of each of the plurality of operational event clusters by partitioning each of the plurality of operational event clusters into a plurality of second discrete time intervals within a second time period that is longer than the expected length of the reconnaissance phase of the cyber-attack, the determining the operational cumulative trajectory of the each of the plurality of operational event clusters further comprising:
      determining a second centroid of a respective operational event cluster at each of the plurality of second discrete time intervals to which the respective operational event cluster is partitioned; and
      determining a centroid for an operational cumulative rolling wave corresponding to the respective operational event cluster at the each of the plurality of second discrete time intervals to which the respective operational event cluster is partitioned using a sum of the second centroid of the each of the plurality of second discrete time intervals to which the respective operational event cluster is partitioned and the second centroids of all previous second discrete time intervals of the each of the plurality of second discrete time intervals to which the respective operational event cluster is partitioned, the operational cumulative rolling wave for a first one of the plurality of second discrete time intervals to which the respective operational event cluster is partitioned is the second centroid of the first one of the plurality of second discrete time intervals;
   detecting, by the processor, the cyber-attack occurring within the plurality of target systems by comparing the baseline cumulative trajectories of the plurality of baseline event clusters with the operational cumulative trajectories of the plurality of operational event clusters and determining that the baseline cumulative trajectories and the operational cumulative trajectories diverge by more than a predetermined distance; and
   outputting, by the processor, an indication regarding the detected cyber-attack.

2. The method of claim 1, wherein:
the plurality of deterministic target systems include a plurality of types, and the plurality of types include a plurality of configurations;
the baseline event data includes a plurality of records that associate baseline events, respectively, with a timestamp, one of the plurality of types, and one of the plurality of configurations; and
the operational event data includes a plurality of records that associate operational events, respectively, with a timestamp, one of the plurality of types, and one of the plurality of configurations.

3. The method of claim 2, wherein:
the plurality of types comprise a plurality of aircraft fleets; and
the plurality of configurations comprise configurations of data processing systems in the plurality of aircraft fleets.

4. The method of claim 2, further comprising:
determining a number of configurations included in the plurality of types; and
determining initial baseline event clusters by partitioning pairs of complementary baseline events into a first plurality of sets corresponding to the number of configurations; and
determining initial operational event clusters by partitioning pairs of complementary operational events into a second plurality of sets corresponding to the number of configurations.

5. The method of claim 4, wherein:
determining, using the initial baseline event clusters, the plurality of baseline event clusters using a K-means clustering algorithm; and
determining, using the initial operational event clusters, the plurality of operational event clusters using the K-means clustering algorithm.

6. The method of claim 1, wherein comparing the baseline cumulative trajectories with the operational cumulative trajectories comprises plotting a graph comparing the centroid for the baseline cumulative rolling wave over the plurality of first discrete time intervals with the centroid for the operational cumulative rolling wave over the plurality of second discrete time intervals.

7. The method of claim 1, wherein:
the operational event data includes activities of the advanced persistent threat cyber-attack that determine network information of the target systems.

8. The method of claim 1, wherein the baseline event data and the operational event data include information describing the target systems and event data generated by the target systems.

9. The method of claim 7, wherein:
the plurality of target systems include a plurality of target system types; and
the plurality of target system types include one or more target system configurations;
the baseline event data and the operational event data associate the activities of the advanced persistent threat cyber-attack with the plurality of the target system types, the one more target system configurations, and the timestamps.

10. The method of claim 9, further comprising
determining a number of the target system configurations included in the plurality of types; and
determining the baseline event clusters by partitioning the pairs of complementary baseline events into a first plurality of sets corresponding to the number of configurations;
determining the operational event clusters by partitioning the pairs of complementary operational events into a second plurality of sets corresponding to the number of configurations;
determining, using the baseline event clusters, the plurality of baseline event clusters using a K-means clustering algorithm; and
determining, using initial operational event clusters, the plurality of operational event clusters using the K-means clustering algorithm.

11. A system detecting a cyber-attack, the system comprising:
a processor;
a computer-readable hardware storage device;
program instructions stored on the computer-readable hardware storage device for execution by the processor that control the system to perform operations comprising:
receiving baseline event data during operation of a plurality of target systems directly after being initially fielded or directly after being upgraded, the baseline event data including records logged by deterministic data processing systems operated by the plurality of target systems, the baseline event data being time-stamped information of predefined types of data processing events that are indicative of advanced persistent threat cyber-attacks;
determining a plurality of baseline event clusters using the baseline event data by determining one or more pairs of complementary baseline events recorded in the baseline event data that are related to activities performed during an advanced persistent threat cyber-attack to elicit a response from the plurality of target systems;
determining a baseline cumulative trajectory of each of the plurality of baseline event clusters by partitioning the each of the plurality of event clusters into a plurality of first discrete time intervals within a first time period that is longer than an expected length of a reconnaissance phase of the advanced persistent threat cyber-attack, the determining the baseline cumulative trajectory of the each of the plurality of baseline event clusters further comprising:
determining a first centroid of a respective baseline event cluster at the each of the plurality of first discrete time intervals to which the respective baseline event cluster is partitioned, and
determining a centroid for a baseline cumulative rolling wave corresponding to the respective baseline event cluster at the each of the plurality of first discrete time intervals to which the respective baseline event cluster is partitioned using a sum of the first centroid of the each of the plurality of first discrete time intervals to which the respective baseline event cluster is partitioned and the first centroids of all previous first discrete time intervals of the each of the plurality of first discrete time intervals to which the respective baseline event cluster is partitioned, the baseline cumulative rolling wave for a first one of the plurality of first discrete time intervals to which the respective baseline event cluster is partitioned is the first centroid of the first one of the plurality of first discrete time intervals;

receiving, by the processor and from the plurality of the target systems, operational event data including records logged by the deterministic data processing systems, the operational event data being timestamped information of predefined types of data processing events that are indicative of advanced persistent threat cyber-attacks;

determining a plurality of operational event clusters using the operational event data by determining one or more pairs of complementary operational events recorded in the operational event data that are related to the activities performed during the cyber-attack;

determining an operational cumulative trajectory of each of the plurality of operational event clusters by partitioning each of the plurality of operational event clusters into a plurality of second discrete time intervals within a second time period that is longer than the expected length of the reconnaissance phase of the cyber-attack, the determining the operational cumulative trajectory of the each of the plurality of operational event clusters further comprising:

determining a second centroid of a respective operational event cluster at each of the plurality of second discrete time intervals to which the respective operational event cluster is partitioned; and determining a centroid of an operational cumulative rolling wave corresponding to the respective operational event cluster at the each of the plurality of second discrete time intervals to which the respective operational event cluster is partitioned using a sum of the second centroid of the each of the plurality of second discrete time intervals to which the respective operational event cluster is partitioned and the second centroids of all previous second discrete time intervals of the each of the plurality of second discrete time intervals to which the respective operational event cluster is partitioned, the operational cumulative rolling wave for a first one of the plurality of second discrete time intervals to which the respective operational event cluster is partitioned is the second centroid of the first one of the plurality of second discrete time intervals;

detecting the cyber-attack occurring within the plurality of target systems by comparing the baseline cumulative trajectories of the plurality of baseline event clusters with the operational cumulative trajectories of the plurality of operational event clusters and determining that the baseline cumulative trajectories and the operational cumulative trajectories diverge by more than a predetermined distance; and outputting an indication regarding the detected cyber-attack.

12. The system of claim 11, wherein:
the plurality of deterministic target systems include a plurality of types, and the plurality of types include one or more configurations;
the baseline event data includes a plurality of records that associate baseline events, respectively, with a timestamp, one of the plurality of types, and one of a plurality of configurations; and
the operational event data includes a plurality of records that associate operational events, respectively, with a timestamp, one of the plurality of types and one of the plurality of configurations.

13. The system of claim 12, wherein:
the plurality of types comprise a plurality of aircraft fleets; and
the plurality of configurations comprise configurations of data processing systems in the plurality of aircraft fleets.

14. The system of claim 13, further comprising:
determining a number of configurations included in the plurality of types; and
determining initial baseline event clusters by partitioning pairs of complementary baseline events into a first plurality of sets corresponding to the number of configurations; and
determining initial operational event clusters by partitioning pairs of complementary operational events into a second plurality of sets corresponding to the number of configurations.

15. The system of claim 14, wherein:
determining, using the initial baseline event clusters, the plurality of baseline event clusters using a K-means clustering algorithm; and
determining, using the initial operational event clusters, the plurality of operational event clusters using the K-means clustering algorithm.

16. The system of claim 11, wherein comparing the baseline cumulative trajectories with the operational cumulative trajectories comprises plotting a graph comparing the centroid for the baseline cumulative rolling wave over the plurality of first discrete time intervals with the centroid for the operational cumulative rolling wave over the plurality of second discrete time intervals.

17. The system of claim 11, wherein:
the operational event data includes activities of the advanced persistent threat cyber-attack that determine network information of the target systems.

18. The system of claim 11 wherein the baseline event data and the operational event data include information describing the target systems and event data generated by the target systems.

19. A computer-program product comprising computer-readable program instructions stored on a computer-readable data storage device that, when executed by a processor, controls a computing device to perform operations comprising:
receiving baseline event data during operation of a plurality of target systems directly after being initially fielded or directly after being upgraded, the baseline event data including records logged by deterministic data processing systems operated by the plurality of target systems, the baseline event data being time-stamped information of predefined types of data processing events that are indicative of advanced persistent threat cyber-attacks;
determining a plurality of baseline event clusters using the baseline event data by determining one or more pairs of complementary baseline events recorded in the baseline event data that are related to activities performed during an advanced persistent threat cyber-attack to elicit a response from the plurality of target systems;
determining a baseline cumulative trajectory of each of the plurality of baseline event clusters by partitioning the each of the plurality of event clusters into a plurality of first discrete time intervals within a first time period that is longer than an expected length of a reconnaissance phase of the advanced persistent threat cyber-attack, the determining the baseline cumulative trajectory of the each of the plurality of baseline event clusters further comprising:
  determining a first centroid of a respective baseline event cluster at the each of the plurality of first discrete time intervals to which the respective baseline event cluster is partitioned, and
  determining a centroid for a baseline cumulative rolling wave corresponding to the respective baseline event cluster at the each of the plurality of first discrete time intervals to which the respective baseline event cluster is partitioned using a sum of the first centroid of the each of the plurality of first discrete time intervals to which the respective baseline event cluster is partitioned and the first centroids of all previous first discrete time intervals of the each of the plurality of first discrete time intervals to which the respective baseline event cluster is partitioned, the cumulative rolling wave for a first one of the plurality of first discrete time intervals to which the respective baseline event cluster is partitioned is the first centroid of the first one of the plurality of first discrete time intervals;
receiving, by the processor and from the plurality of the target systems, operational event data including records logged by the deterministic data processing systems, the operational event data being time-stamped information of predefined types of data processing events that are indicative of advanced persistent threat cyber-attacks;
determining a plurality of operational event clusters using the operational event data by determining one or more pairs of complementary operational events recorded in the operational event data that are related to activities performed during the advanced persistent threat cyber-attack;
determining an operational cumulative trajectory of each of the plurality of operational event clusters by partitioning each of the plurality of operational event clusters into a plurality of second discrete time intervals within a second time period that is longer than the expected length of the reconnaissance phase of the cyber-attack, the determining the operational cumulative trajectory of the each of the plurality of operational event clusters further comprising:
  determining a second centroid of a respective operational event cluster at each of the plurality of second discrete time intervals to which the respective operational event cluster is partitioned; and
  determining a centroid of an operational cumulative rolling wave corresponding to the respective operational event cluster at the each of the plurality of second discrete time intervals to which the respective operational event cluster is partitioned using a sum of the second centroid of the each of the plurality of second discrete time intervals to which the respective operational event cluster is partitioned and the second centroids of all previous second discrete time intervals of the each of the plurality of second discrete time intervals to which the respective operational event cluster is partitioned, the operational cumulative rolling wave for a first one of the plurality of second discrete time intervals to which the respective operational event cluster is partitioned is the second centroid of the first one of the plurality of second discrete time intervals;
detecting the cyber-attack occurring within the plurality of target systems by comparing the baseline cumulative trajectories of the plurality of baseline event clusters with the operational cumulative trajectories of the plurality of operational event clusters and determining that the baseline cumulative trajectories and the operational cumulative trajectories diverge by more than a predetermined distance; and
outputting an indication regarding the detected cyber-attack.

20. The computer program product of claim 19, wherein the operations further comprise:
  determining a number of configurations included in the plurality of target systems;
  determining initial baseline event clusters by partitioning pairs of complementary baseline events into a first plurality of sets corresponding to the number of configurations; and
  determining, using the initial baseline event clusters, the plurality of baseline event clusters using a K-means clustering algorithm;
  determining initial operational event clusters by partitioning pairs of complementary operational events into a second plurality of sets corresponding to the number of configurations; and
  determining, using the initial operational event clusters, the plurality of operational event clusters using the K-means clustering algorithm.

\* \* \* \* \*